United States Patent [19]

Suzuki et al.

[11] Patent Number: 5,723,395
[45] Date of Patent: Mar. 3, 1998

[54] DIELECTRIC CERAMIC COMPOSITION, ITS PREPARATION METHOD, MULTILAYER CHIP CAPACITOR, DIELECTRIC FILTER, AND ELECTRONIC PARTS

[75] Inventors: Takashi Suzuki, Akita; Tomoaki Kawata, Chiba; Kunihiko Kawasaki, Akita; Masako Nitta, Ibaraki, all of Japan

[73] Assignee: TDK Corporation, Tokyo, Japan

[21] Appl. No.: 672,330

[22] Filed: Jun. 28, 1996

[30] Foreign Application Priority Data

Jun. 30, 1995 [JP] Japan ................. 7-165912

[51] Int. Cl.⁶ ................................ C04B 35/46
[52] U.S. Cl. ................................ 501/134; 501/32
[58] Field of Search ......................... 501/134, 32

[56] References Cited

FOREIGN PATENT DOCUMENTS

| 61-14611 | 4/1986 | Japan . |
|---|---|---|
| 62-57042 | 11/1987 | Japan . |
| 1-236514 | 9/1989 | Japan . |
| 4-16884 | 3/1992 | Japan . |
| 5-234420 | 9/1993 | Japan . |
| 5-266709 | 10/1993 | Japan . |
| 5-325641 | 12/1993 | Japan . |
| 6-243725 | 9/1994 | Japan . |

*Primary Examiner*—Deborah Jones
*Attorney, Agent, or Firm*—Oblon, Spivak, McClelland, Maier & Neustadt, P.C.

[57] ABSTRACT

In a dielectric ceramic composition comprising $TiO_2$ and ZnO as a main component, $B_2O_3$ and/or a $B_2O_3$-containing vitreous component is contained as an auxiliary component. This establishes a low-temperature firing capability which permits Ag, Cu, Ag base alloy or Cu base alloy to be used as an internal conductor. A choice of a compositional ratio of the main component enables a choice of a temperature coefficient while a choice of the content of the auxiliary component enables a choice of a sintering temperature. It is further possible to control the crystalline structure, dielectric constant, Q value, temperature coefficient, insulation resistance (IR) and grain size of the composition by adding a Cu oxide, Ni oxide, Mn oxide, and Si oxide and adjusting their contents.

10 Claims, 3 Drawing Sheets

ZnO–TiO$_2$

—System ZnO–TiO$_2$. Inset shows alternative incongruent melting of Zn$_2$TiO$_4$.

F. H. Dulin and D. E. Rase, *J. Am. Ceram. Soc.*, 43 [3] 130 (1960).

DIELECTRIC CERAMIC COMPOSITION, ITS PREPARATION METHOD, MULTILAYER CHIP CAPACITOR, DIELECTRIC FILTER, AND ELECTRONIC PARTS

BACKGROUND OF THE INVENTION

1. Field of the Invention

This invention relates to a dielectric ceramic composition comprising $TiO_2$ and ZnO as a main component and possessing a low-temperature firing capability which permits Ag, Cu, Ag base alloy or Cu base alloy to be used as an internal conductor, a method for preparing the same, and various electronic parts using the same.

2. Prior Art

Recently, products of smaller size and higher performance have been successively developed in the fields of audiovisual equipment, computer equipment, and mobile communications equipment. With respect to various electronic parts used therein, there is an increasing demand for size reduction, performance improvement and realization of surface mount devices (SMD). Accordingly, as to capacitor parts, the market of multilayer chip capacitors having layers of electrode conductor therein is spreading.

Although noble metals such as Au, Pt, and Pd have long been used as the internal conductor of multilayer chip capacitors, a transition from these conductor materials to less expensive conductor materials such as Ag, Cu, Ag base alloy or Cu base alloy now takes place from the standpoint of cost reduction. In particular, a greater demand is imposed on Ag and Ag base alloys because their low DC resistance leads to the advantage that they can improve the Q performance of capacitors. Since Ag and Ag base alloys, however, have a melting point as low as about 960° C., there is a need for a dielectric material which can be effectively fired at lower temperatures.

Further, where capacitors are used in combination with coil elements so as to form circuits typically known as LC circuits or where it is desired to form composite electronic parts comprising both a capacitor and a coil, the capacitor element is required to have such a temperature coefficient as to compensate for the temperature coefficient of the coil element, that is, to function as a temperature-compensating capacitor. In this regard, it is important that a dielectric ceramic composition can be adjusted to any desired temperature coefficient.

Moreover, the following points are important where dielectric filters are formed using a dielectric ceramic composition. (1) The dielectric ceramic composition should have a relatively high dielectric constant in order to provide for device size reduction since the length of resonator is restricted by the dielectric constant of dielectric material near the microwave frequency used in mobile telephones. (2) The dielectric ceramic composition should have a low temperature coefficient of dielectric constant in order to minimize the variation of characteristics with a temperature change. (3) The dielectric material should have a high Q value since the Q value of dielectric material has an influence on the insertion loss required for the dielectric filter. Also, to use a low resistance internal conductor is effective for improving the Q value of devices as previously mentioned.

To satisfy these requirements, there were invented dielectric ceramic compositions which can be fired at about 900° C., for example, a composition comprising $TiO_2$ as a main component as disclosed in Japanese Patent Publication (JP-B) No. 57042/1987, a composition comprising $SrTiO_3$ as a main component as disclosed in Japanese Patent Application Kokai (JP-A) No. 236514/1989, and a composition comprising $(SrCa)TiO_3$ as a main component as disclosed in JP-A 243725/1994. There were also invented materials for dielectric filters characterized by a very low temperature coefficient, for example, a composition comprising $BaO$-$TiO_2$ as a main component as disclosed in JP-A 325641/1993 and a composition comprising $BaO$-$TiO_2$-$Nd_2O_3$ as a main component as disclosed in JP-A 234420/1993. These compositions have their own temperature coefficient and do not allow for a choice of any desired temperature coefficient from a wide spectrum.

DISCLOSURE OF THE INVENTION

With respect to a dielectric ceramic material comprising $TiO_2$ and ZnO as a main component, it is known that any desired temperature coefficient can be selected by changing the blend ratio and especially a very small temperature coefficient is available from a particular composition (see MOTOKI Yoichi, "Fine Ceramics," Gihodo Publishing K.K., pp. 788–789). This is a very useful dielectric material for temperature compensating capacitors, capacitor elements of LC filters integrated with magnetic material, and dielectric filters.

However, its sintering temperature is as high as about 1,300° C. Where multilayer chip capacitors were constructed using this ceramic material, it was impossible to use Ag, Cu and Ag or Cu base alloys having a low melting point as the internal conductor. Also there has been proposed no invention that makes it possible to use such low-melting electrode materials in combination with the dielectric ceramic material comprising $TiO_2$ and ZnO as a main component.

An object of the present invention is to impart a low-temperature firing capability which permits Ag, Cu, Ag base alloy or Cu base alloy to be used as an internal conductor to a dielectric ceramic composition comprising $TiO_2$ and ZnO as a main component and to provide various electronic parts using such a dielectric ceramic composition.

These and other objects are attained by the present invention which is defined below as (1) to (14).

(1) A dielectric ceramic composition comprising $TiO_2$ and ZnO as a main component and $B_2O_3$ and/or a $B_2O_3$-containing vitreous component as an auxiliary component.

(2) The dielectric ceramic composition of (1) wherein said main component consists of 40 to 90 mol % of $TiO_2$ and 60 to 10 mol % of ZnO and said auxiliary component is contained in an amount of 0.1 to 6% by weight calculated as $B_2O_3$ and based on the weight of said main component.

(3) The dielectric ceramic composition of (1) further comprising at least one of a Cu oxide, a Ni oxide, and a Fin oxide, whose contents are up to 10% by weight calculated as CuO, NiO and MnO, respectively, and based on the weight of said main component.

(4) The dielectric ceramic composition of (1) which is prepared by mixing $TiO_2$ and ZnO as raw materials for said main component, calcining the mixture, mixing the mixture with $B_2O_3$ and/or a $B_2O_3$-containing vitreous component as a raw material for said auxiliary component, and firing the resulting mixture.

(5) The dielectric ceramic composition of (1) which is prepared by mixing $TiO_2$ and ZnO as raw materials for said main component with up to 6% by weight based on the weight of the main component raw materials of $SiO_2$, calcining the mixture, mixing the mixture with $B_2O_3$ and/or a $B_2O_3$ containing vitreous component as a raw material for said auxiliary component, and firing the resulting mixture.

(6) The dielectric ceramic composition of (1) which is used in a multilayer chip capacitor.

(7) The dielectric ceramic composition of (1) which is used in a dielectric filter.

(8) The dielectric ceramic composition of (1) which is used in an electronic part comprising a capacitor section and an inductor section.

(9) A multilayer chip capacitor using the dielectric ceramic composition of (1).

(10) The multilayer chip capacitor of (9) wherein Ag, Cu, Ag base alloy or Cu base alloy is used as an internal conductor.

(11) A dielectric filter using the dielectric ceramic composition of (1).

(12) The dielectric filter of (11) wherein Ag, Cu, Ag base alloy or Cu base alloy is used as an internal conductor.

(13) An electronic part comprising an inductor section and a capacitor section using the dielectric ceramic composition of (1).

(14) The electronic part of (13) wherein Ag, Cu, Ag base alloy or Cu base alloy is used as an internal conductor.

FUNCTION AND BENEFITS

According to the invention, by introducing $B_{2O3}$ and/or a $B_2O_3$-containing vitreous component as an auxiliary component in a dielectric ceramic composition comprising $TiO_2$ and ZnO as a main component, the composition is modified such that it can be fired at a temperature below the melting point of Ag, Cu, Ag base alloy or Cu base alloy. This provides a dielectric ceramic composition from which electronic parts can be constructed using these metals as the internal conductor, eventually achieving an improvement in electrical properties and a reduction of manufacturing cost.

A temperature coefficient can be selected through a choice of a compositional ratio of the main component. A sintering temperature can be selected through a choice of the content of the auxiliary component. It is further possible to control the crystalline structure, dielectric constant, Q value, temperature coefficient, insulation resistance (IR) and grain size of the composition by adding a Cu oxide, Ni oxide, Mn oxide, and Si oxide and adjusting their contents.

The use of the inventive dielectric ceramic composition allows for firing at a temperature below the melting point of Ag or Cu or an Ag or Cu base alloy, which was difficult in the prior art. These metals can be used as the internal conductor where electronic chip parts are constructed. Certain compositions can be applied to temperature-compensating ceramic capacitors having a wide range of temperature coefficient and dielectric filters which can be reduced in insertion loss and size. Using these relatively inexpensive electrodes, the device cost can be reduced.

DESCRIPTION OF EMBODIMENTS

Figure 1:
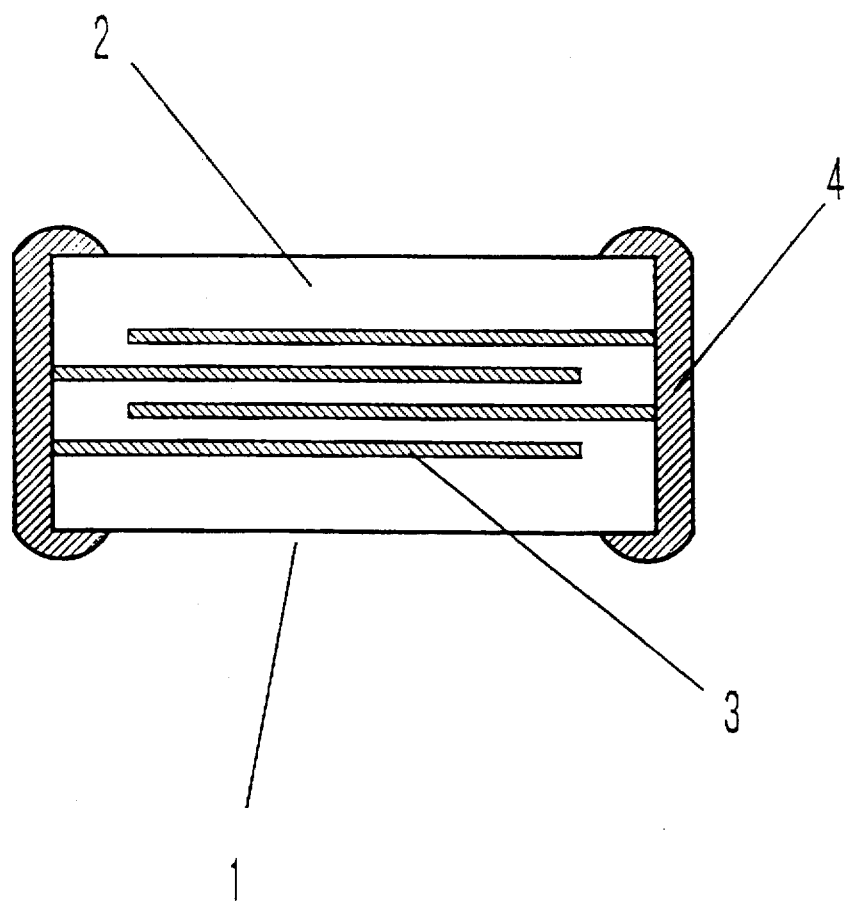
FIG. 1 is a cross-sectional view showing one exemplary construction of a multilayer chip capacitor.

With respect to a dielectric ceramic composition comprising $TiO_2$ and ZnO as a main component, any desired temperature coefficient is obtainable from a wide range by selecting the compositional ratio. The preferred compositional ratio of the main component is such that it consists of 40 to 90 mol % of $TiO_2$ and 60 to 10 mol % of ZnO. Where $TiO_2$ is more than 90 mol % or ZnO is less than 10 mol %, the temperature coefficient becomes substantially constant and the advantage of selecting a temperature coefficient from a wide range is not fully obtained. Where $TiO_2$ is less than 40 mol % or ZnO is more than 60 mol %, a composition has a greater positive value of temperature coefficient, but is unuseful as a temperature-compensating dielectric material since coil elements generally have a positive temperature coefficient.

Further the containment of $B_2O_3$ and/or a $B_2O_3$-containing vitreous component as an auxiliary component permits the dielectric material to be fired at low temperature. The content of the auxiliary component calculated as $B_2O_3$ is preferably 0.1 to 6.0% by weight based on the weight of the main component. Compositions with a less content of the auxiliary component would have a sintering temperature which is higher than the melting point of Ag, Cu, and Ag or Cu base alloys as a main component, obstructing the use of such internal conductors which is one of the objects of the invention. Compositions with a more content of the auxiliary component would be less resistant to acid so that acid might erode the basis material during plating to deteriorate the dielectric characteristics thereof.

$B_2O_3$ is an essential constituent of the auxiliary component used herein and effective for lowering the sintering temperature of a dielectric ceramic composition comprising $TiO_2$ and ZnO as a main component. $B_2O_3$ used alone is fully effective while even a vitrified $B_2O_3$ component is fully effective. In particular, it is preferred to use a vitrified $B_2O_3$ component because $B_2O_3$ used alone is so water soluble that handling of $B_2O_3$ is difficult during manufacturing process, but vitrification renders the $B_2O_3$ component relatively stable to water.

The glass containing $B_2O_3$ in its composition is preferably one containing at least one of ZnO, $SiO_2$ and $Bi_2O_3$ in addition to $B_2O_3$. Exemplary are $ZnO-SiO_2$—$B_2O_3$ systems, $SiO_2$—$B_2O_3$ systems, and $Bi_2O_3$—$ZnO$—$B_2O_3$ systems. Any of these glass systems is useful in the practice of the invention. If the proportion of $B_2O_3$ in the glass as the auxiliary component is too low, in other words, if the proportion of oxides other than $B_2O_3$ in the auxiliary component is too high, the glass must be added in a larger amount in order to provide a necessary amount of $B_2O_3$ for low-temperature firing. In this case, the other oxides can cause deterioration of sinterability, lowering of a dielectric constant, and deterioration of Q characteristics. A larger amount of the glass added would also cause an increase of the product cost because the cost of glass is generally higher than the main component and other components to be described later. If the proportion of $B_2O_3$ in the glass as the auxiliary component is too high, on the other hand, there arise no problems with respect to low-temperature firing and other features, but such a glass material is highly water soluble like the $B_2O_3$ used alone as the auxiliary component and thus difficult to handle during manufacturing process. From these points of view, the proportion of $B_2O_3$ in glass is preferably in the range of 5 to 60% by weight.

When a dielectric ceramic composition comprising $TiO_2$ and ZnO as a main component is fired at or near the temperature allowing for the use of Ag, Cu, Ag base alloy or Cu base alloy as the internal conductor, there are mainly formed three phases of $Zn_2TiO_4$+rutile, $ZnTiO_3$+rutile, and $Zn_2TiO_4$+$ZnTiO_3$. The respective phases have different dielectric characteristics, and to stabilize the phases of formation is very important for stabilizing the quality of capacitors and dielectric filters.

The dielectric ceramic composition of the invention may contain at least one of a copper oxide, nickel oxide, and manganese oxide.

The copper oxide or nickel oxide, though it need not necessarily be contained, allows for stable formation of the $Zn_2TiO_4$ +rutile phase if it is present in the dielectric ceramic composition. Preferably the content of copper oxide is up to 10% by weight (exclusive of 0% by weight) calculated as CuO and based on the weight of the main component and the content of nickel oxide is up to 10% by weight (exclusive of 0% by weight) calculated as NiO and based on the weight of the main component. If the content of copper oxide is more than this limit, there would occur inconvenience such as disconnection due to diffusion of the internal conductor and plating of the basis material itself during plating. If the content of nickel oxide is more than this limit, on the other hand, the sintering temperature would become high enough to obstruct the use of Ag, Cu, Ag base alloy or Cu base alloy as the internal conductor. A significant additive effect is obtainable if the sum of CuO and NiO is at least 0.1% by weight based on the weight of the main component.

The manganese oxide, though it need not necessarily be contained, is effective for increasing insulation resistance if it is present in the dielectric ceramic composition. Preferably the content of manganese oxide is up to 10% by weight (exclusive of 0% by weight), especially 0.1 to 10% by weight calculated as MnO and based on the weight of the main component. If the content of manganese oxide is more than this limit, the sintering temperature would become high enough to obstruct the use of Ag, Cu, Ag base alloy or Cu base alloy as the internal conductor when multilayer chip parts are constructed.

The dielectric ceramic composition of the invention is prepared through the steps of mixing raw materials so as to provide the above-mentioned composition, calcining, pulverizing, molding, and firing the mixture. Desired dielectric characteristics can be obtained by properly selecting the composition and preparation conditions. It is preferred to calcine a mixture of main component raw materials $TiO_2$ and ZnO prior to mixing of all the components. With this calcination, dielectric characteristics are not altered, but the growth of crystal grains during firing is suppressed, which is advantageous for forming thin layers when multilayer chip capacitors are constructed. Subsequent to the calcination, the calcined mixture is mixed with $B_2O_3$ or a $B_2O_3$-containing glass as an auxiliary component raw material, calcined again, pulverized, molded and fired, obtaining a dielectric ceramic material. Raw materials for copper, nickel and manganese oxides may be either mixed with $TiO_2$ and ZnO and calcined, or added together with the auxiliary component after calcination of $TiO_2$ and ZnO.

When a carbonate such as $MnCO_3$ is used as a raw material, $CO_2$ is released upon heating. Inconvenience such as cracking and deformation is likely to occur if $CO_2$ is released after molding. Therefore, if a carbonate is used as a raw material, it should preferably be added such that it can be calcined together with the main component raw materials.

Though not critical, by adding $SiO_2$ to the main component raw materials during calcination of the main component raw materials, the growth of crystal grains during firing can be further suppressed. The amount of $SiO_2$ added is desirably up to 6% by weight (exclusive of 0% by weight), more preferably 0.1 to 5% by weight based on the total of the main component raw materials $TiO_2$ and ZnO. Beyond this limit, the sintering temperature would become high enough to obstruct the use of Ag, Cu, Ag base alloy or Cu base alloy as the internal conductor.

When the main component raw materials or the main component raw materials and $SiO_2$ are calcined, preferred calcining conditions include 900° to 1,100° C. and ½ to 10 hours. When a mixture of the thus calcined material with an auxiliary component raw material is subject to second calcination or when the entire raw materials are mixed and calcined simultaneously, preferred calcining conditions include 600° to 850° C. and ½ to 10 hours. Preferred firing conditions include 850° to 930° C. and ½ to 10 hours. Calcination and firing are preferably carried out in an oxidizing atmosphere such as air. The phase of formation can be controlled by changing firing conditions, and desired dielectric characteristics can be accomplished.

The dielectric ceramic composition of the invention is applicable to various electronic parts such as multilayer chip capacitors, dielectric filters, and electronic parts having capacitor and inductor sections. A multilayer chip capacitor 1 is illustrated in FIG. 1 as a chip part comprising a chip body having alternately deposited layers of dielectric material 2 and internal conductor 3 and external conductors 4 disposed on the outer surface of the chip body and connected to the internal conductor layers 3. The dielectric ceramic composition of the invention is used to form the dielectric material. The structure of the dielectric filter to which the dielectric ceramic composition of the invention is applied is not particularly limited although the dielectric ceramic composition of the invention is especially suitable for dielectric filters of the structure which requires simultaneous firing of internal conductor and dielectric material. The electronic part having capacitor and inductor sections, that is, composite LC part is a multilayer part having a capacitor section of the same structure as the multilayer chip capacitor and an inductor section of the same structure as the multilayer chip inductor. The dielectric ceramic composition of the invention is used to form the dielectric material of the capacitor section.

EXAMPLE

Example 1

There were furnished main component raw materials ($TiO_2$ and ZnO) and an auxiliary component raw material ($B_2O_3$ or $B_2O_3$-containing glass), which were weighed to provide a composition as shown in Table 1, wet milled for 16 hours in a ball mill, and then dried. The $B_2O_3$-containing glass used herein was a glass consisting of 65% by weight of ZnO, 15% by weight of $SiO_2$, and 20% by weight of $B_2O_3$. The dried powder was then calcined in air at 800° C. for 2 hours. The calcined powder was wet milled in a ball mill until a mean particle size of about 0.1 to 0.3 μm was finally reached and then dried, obtaining a dielectric material powder. To 100 parts by weight of the dielectric material powder were added 3.2 parts by weight of ethyl cellulose and 2.8 parts by weight of polyvinyl butyral as a binder and 87 parts by weight of terpineol and 5 parts by weight of butyl carbitol as a solvent. The mixture was mixed in an automated mortar and dispersed in a three-roll mill, obtaining a dielectric material paste. The dielectric material paste and a silver paste were alternately applied by a screen printing technique to form a layered structure which was cut into a chip of 4.5 mm×3.2 mm. The resulting green chip was fired in air at 870° C. for 2 hours. Silver was baked to the chip as the external conductor, obtaining a multilayer chip capacitor sample of the structure shown in FIG. 1.

The thus prepared samples had dielectric characteristics as shown in Table 1.

Example 1. The dried powder was then calcined in air at 800° C. for 2 hours. The calcined powder was wet milled particle size until a mean particle size of about 0.1 to 0.3 μm was finally reached and then dried, obtaining a dielectric

TABLE 1

$B_2O_3$ content vs. dielectric characteristics

| Sample No. | $TiO_2$ (mol %) | ZnO (mol %) | $B_2O_3$ | $B_2O_3$-glass (calcd. as $B_2O_3$) (wt %) | Relative density (%) | Dielectric constant | Q | Temperature coefficient (ppm/°C.) |
|---|---|---|---|---|---|---|---|---|
| 1* | 54 | 46 | — | — | ≦70% | Unmeasurable*1 | | |
| 2* | 54 | 46 | 0.05 | — | ≦85% | 20.0 | 100 | 80 |
| 3 | 54 | 46 | 0.1 | — | ≧90% | 26.5 | 7000 | 50 |
| 4 | 54 | 46 | 0.2 | — | ≧95% | 27.0 | 10000 | 48 |
| 5 | 54 | 46 | 0.5 | — | ≧95% | 27.5 | 8500 | 40 |
| 6 | 54 | 46 | 1.0 | — | ≧95% | 27.3 | 4000 | 45 |
| 7 | 54 | 46 | 3.0 | — | ≧95% | 27.0 | 3000 | 40 |
| 8 | 54 | 46 | 6.0 | — | ≧90% | 26.0 | 2000 | 40 |
| 9* | 54 | 46 | 8.0 | — | ≦80% | Unmeasurable*2 | | |
| 10* | 54 | 46 | — | 0.01 | ≦70% | Unmeasurable*1 | | |
| 11 | 54 | 46 | — | 0.1 | ≧90% | 26.0 | 6000 | 40 |
| 12 | 54 | 46 | — | 0.5 | ≧95% | 26.5 | 6900 | 45 |
| 13 | 54 | 46 | — | 1.0 | ≧95% | 27.0 | 6000 | 38 |
| 14 | 54 | 46 | — | 2.0 | ≧95% | 26.5 | 4500 | 40 |
| 15 | 54 | 46 | — | 3.0 | ≧95% | 26.0 | 3000 | 50 |
| 16 | 54 | 46 | — | 6.0 | ≧90% | 25.0 | 2000 | 65 |
| 17* | 54 | 46 | — | 8.0 | ≦80% | Unmeasurable*2 | | |

*comparative examples
Firing temperature: 870° C. in air
Test configuration: 4532C chip (three layer product)
Measurement frequency: 4 MHz
*1 not consolidated
*2 considerable erosion of basis material by plating As seen from Table 1, dielectric materials have practically acceptable dielectric characteristics insofar as the content of $B_2O_3$ or $B_2O_3$ in glass is within the claimed range of the invention. If the $B_2O_3$ content is less than the claimed rage, the material is not fully consolidated by firing at the firing temperature of 870° C., failing to provide desired dielectric characteristics. If the $B_2O_3$ content is beyond the claimed range, acid resistance lowers, erosion of the basis material during plating becomes significant, and dielectric characteristics are markedly deteriorated.

Example 2

There were furnished main component raw materials ($TiO_2$ and ZnO), an auxiliary component raw material ($B_2O_3$-containing glass), CuO, and NiO, which were weighed to provide a composition as shown in Table 2, wet milled for 16 hours in a ball mill, and then dried. The $B_2O_3$-containing glass used herein was the same as in material powder. To 100 parts by weight of the dielectric material powder were added 3.2 parts by weight of ethyl cellulose and 2.8 parts by weight of polyvinyl butyral as a binder and 87 parts by weight of terpineol and 5 parts by weight of butyl carbitol as a solvent. The mixture was mixed in an automated mortar and dispersed in a three-roll mill, obtaining a dielectric material paste. The dielectric material paste and a silver paste were alternately applied by a screen printing technique to form a layered structure which was cut into a chip of 4.5 mm×3.2 mm. The resulting green chip was fired in air at 870° C. for 2 hours. Silver was baked to the chip as the external conductor, obtaining a multilayer chip capacitor sample.

The thus prepared samples had dielectric characteristics as shown in Table 2. The sintered bodies of the dielectric pastes used in sample Nos. 22 and 23 had X-ray diffraction patterns shown at (1) and (2) in FIG. 2, respectively.

TABLE 2

$TiO_2$ and ZnO composition vs. dielectric characteristics

| Sample No. | $TiO_2$ (mol %) | ZnO (mol %) | CuO | NiO (wt %) | MnO (wt %) | $B_2O_3$-glass (calcd. as $B_2O_3$) | Dielectric constant | Q | Temperature coefficient (ppm/°C.) |
|---|---|---|---|---|---|---|---|---|---|
| 1* | 30 | 70 | 3 | — | — | 1 | 15.0 | 390 | 190 |
| 2* | 35 | 65 | 3 | — | — | 1 | 17.0 | 430 | 160 |
| 3 | 40 | 60 | 3 | — | — | 1 | 20.0 | 450 | 100 |
| 4 | 44 | 56 | 3 | — | — | 1 | 24.5 | 470 | 75 |
| 5 | 46 | 54 | 3 | — | — | 1 | 27.0 | 500 | 5 |
| 6 | 48 | 52 | 3 | — | — | 1 | 28.5 | 500 | −60 |
| 7 | 50 | 50 | 3 | — | — | 1 | 34.5 | 550 | −100 |

TABLE 2-continued

TiO₂ and ZnO composition vs. dielectric characteristics

| Sample No. | TiO$_2$ (mol %) | ZnO (mol %) | CuO | NiO (wt %) | MnO | B$_2$O$_3$-glass (calcd. as B$_2$O$_3$) | Dielectric constant | Q | Temperature coefficient (ppm/°C.) |
|---|---|---|---|---|---|---|---|---|---|
| 8 | 55 | 45 | 3 | — | — | 1 | 40.0 | 600 | −200 |
| 9 | 60 | 40 | 3 | — | — | 1 | 45.0 | 650 | −380 |
| 10 | 80 | 20 | 3 | — | — | 1 | 70.0 | 900 | −680 |
| 11 | 90 | 10 | 3 | — | — | 1 | 80.0 | 1200 | −720 |
| 12 | 46 | 54 | — | 3 | — | 1 | 26.0 | 520 | 10 |
| 13 | 80 | 20 | — | 3 | — | 1 | 68.5 | 950 | −700 |
| 14 | 45 | 55 | — | — | — | 1 | 19.5 | 2000 | 250 |
| 15 | 50 | 50 | — | — | — | 1 | 22.5 | 3500 | 120 |
| 16 | 52 | 48 | — | — | — | 1 | 24.3 | 5400 | 80 |
| 17 | 54 | 46 | — | — | — | 1 | 27.0 | 5200 | 40 |
| 18 | 56 | 44 | — | — | — | 1 | 29.3 | 4800 | 5 |
| 19 | 58 | 42 | — | — | — | 1 | 32.5 | 4700 | −55 |
| 20 | 60 | 40 | — | — | — | 1 | 34.5 | 4700 | −110 |
| 21 | 65 | 35 | — | — | — | 1 | 39.0 | 4500 | −200 |
| 22 | 56 | 44 | — | — | 1 | 2.5 | 29.5 | 4500 | 5 |
| 23 | 56 | 44 | 3 | — | 1 | 2.5 | 42.0 | 620 | −230 |

*comparative examples
Firing temperature: 870° C. in air
Test configuration: 4532C chip (three layer product)
Measurement frequency: 4 MHz
Examples 1–13 developed a Zn$_2$TiO$_4$ + rutile phase whereas Examples 14–21 developed a ZnTiO$_3$ + rutile phase.

Figure 2:
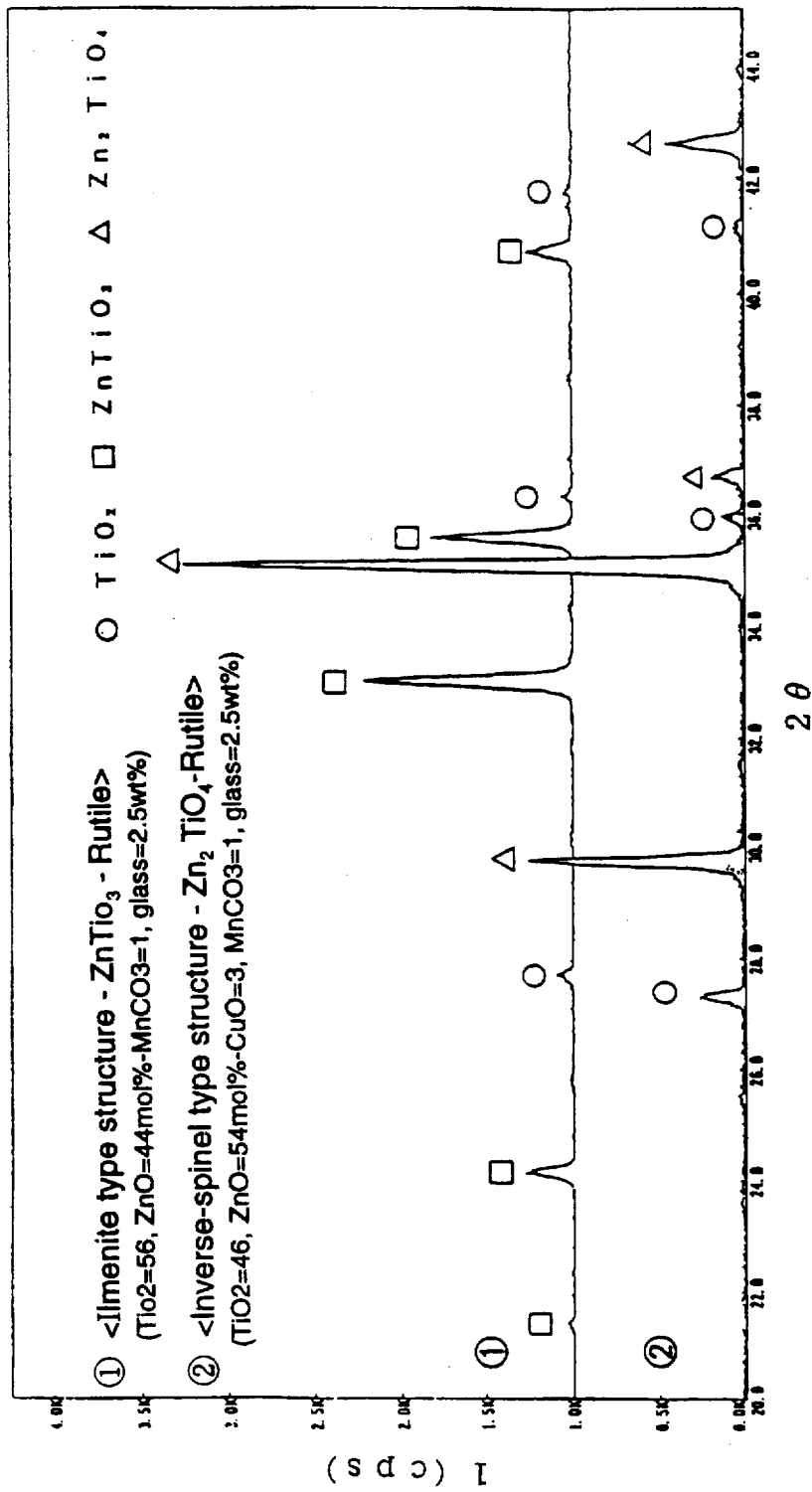
FIG. 2 is an X-ray diffraction pattern of sintered bodies in Example.
Figure 3:
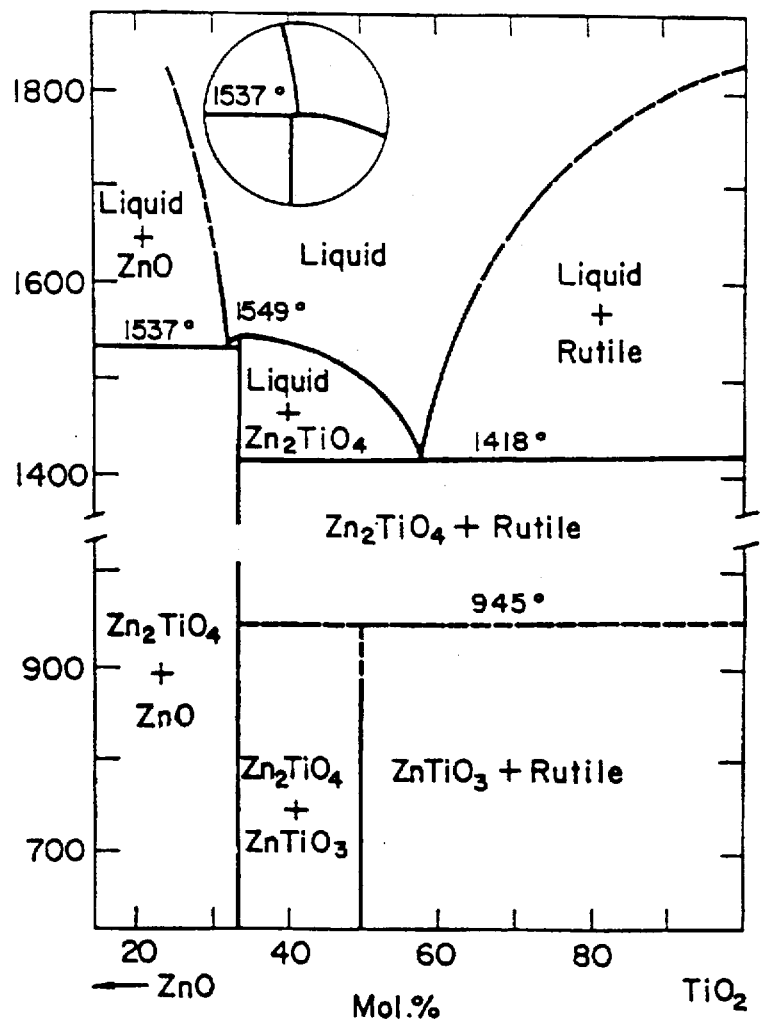
FIG. 3 is a phase diagram of a $TiO_2$-ZnO system.

As seen from the X-ray diffraction patterns shown in FIG. 2, there is formed a Zn$_2$TiO$_4$+rutile phase when CuO is contained and a ZnTiO$_3$+rutile phase when CuO and NiO are not contained. FIG. 3 is a phase diagram of a TiO$_2$-ZnO system. It is generally believed that since a Zn$_2$TiO$_4$+rutile phase forms at 945° C. or higher, this phase does not appear, but a ZnTiO$_3$+rutile phase must appear at the firing temperature of 870° C. used in this example. However, by incorporating CuO and the B$_2$O$_3$-containing glass, a Zn$_2$TiO$_4$+rutile phase can be consistently formed even at a firing temperature of lower than 945° C. Also, though not shown in FIG. 2, similar results are obtained when B$_2$O$_3$ is used instead of the B$_2$O$_3$-containing glass or when NiO is used instead of CuO.

It is seen from Table 2 that dielectric materials containing CuO or NiO show practically acceptable dielectric characteristics when the claimed range is satisfied. Their temperature coefficient can have a value in the wide range between +100 ppm/° C. and −720 ppm/° C. That is, by selecting the compositional ratio of TiO$_2$ to ZnO, the temperature coefficient can be selected in the wide range. Particularly in the range of 40 to 50 mol % of TiO$_2$, that is, 60 to 50 mol % of ZnO, dielectric materials have a very low temperature coefficient. This composition is preferred as a dielectric material for dielectric filters.

It is also seen from Table 2 that dielectric materials free of CuO and NiO show practically acceptable dielectric characteristics when the claimed range is satisfied. Particularly in the range of 50 to 60 mol % of TiO$_2$, that is, 50 to 60 mol % of ZnO, dielectric materials have a very low temperature coefficient. This composition is also preferred as a dielectric material for dielectric filters. Moreover, high Q values are obtainable from the ZnTiO$_3$+rutile phase as compared with the Zn$_2$TiO$_4$+rutile phase.

Example 3

There were furnished main component raw materials (TiO$_2$ and ZnO), an auxiliary component raw material (B$_2$O$_3$-containing glass), CuO, NiO, and MnCO$_3$ which were weighed to provide a composition as shown in Table 3 (MnCO$_3$ was calculated as MnO), wet milled for 16 hours in a ball mill, and then dried. The B$_2$O$_3$-containing glass used herein was the same as in Example 1. The dried powder was then calcined in air at 800° C. for 2 hours. The calcined powder was wet milled in a ball mill until a mean particle size of about 0.1 to 0.3 μm was finally reached and then dried, obtaining a dielectric material powder. To 100 parts by weight of the dielectric material powder were added 3.2 parts by weight of ethyl cellulose and 2.8 parts by weight of polyvinyl butyral as a binder and 87 parts by weight of terpineol and 5 parts by weight of butyl carbitol as a solvent. The mixture was mixed in an automated mortar and dispersed in a three-roll mill, obtaining a dielectric material paste. The dielectric material paste and a silver paste were alternately applied by a screen printing technique to form a layered structure which was cut into a chip of 4.5 mm×3.2 mm. The resulting green chip was fired in air at 850° C. or 890° C. for 2 hours. Silver was baked to the chip as the external conductor, obtaining a chip capacitor sample.

Chip capacitor samples were similarly prepared by weighing main component raw materials (TiO$_2$ and ZnO), an auxiliary component raw material (B$_2$O$_3$-containing glass), and MnCO$_3$ to provide a composition as shown in Table 4 (MnCO$_3$ was calculated as MnO), and repeating the same procedure as above. Note that the firing temperature was 870° C.

These samples had dielectric characteristics as shown in Tables 3 and 4.

TABLE 3

CuO or NiO content vs. dielectric characteristics

| Sample No. | TiO$_2$ (mol %) | ZnO (mol %) | CuO | NiO (wt %) | MnO | B$_2$O$_3$-glass (calcd. as B$_2$O$_3$) | Firing temp. (°C.) | Dielectric constant | Q | Temperature coefficient (ppm/°C.) |
|---|---|---|---|---|---|---|---|---|---|---|
| 1* | 47 | 53 | — | — | 1 | 1 | 850 | 23.0 | 1035 | 186 |
|    |    |    |   |   |   |   | 890 | 30.0 | 455 | −43 |
| 2* | 47 | 53 | 0.5 | — | 1 | 1 | 850 | 24.0 | 460 | 11 |
|    |    |    |    |    |   |   | 890 | 30.5 | 440 | −30 |
| 3 | 47 | 53 | 1.0 | — | 1 | 1 | 850 | 26.5 | 450 | −25 |
|   |    |    |    |    |   |   | 890 | 27.5 | 440 | −35 |
| 4 | 47 | 53 | 2.0 | — | 1 | 1 | 850 | 27.0 | 440 | −20 |
|   |    |    |    |    |   |   | 890 | 28.0 | 460 | −26 |
| 5 | 47 | 53 | 3.0 | — | 1 | 1 | 850 | 27.5 | 480 | −25 |
|   |    |    |    |    |   |   | 890 | 28.0 | 470 | −16 |
| 6 | 47 | 53 | 6.0 | — | 1 | 1 | 850 | 27.5 | 450 | −30 |
|   |    |    |    |    |   |   | 890 | 27.8 | 440 | −20 |
| 7 | 47 | 53 | 10.0 | — | 1 | 1 | 850 | 26.0 | 420 | −25 |
|   |    |    |     |    |   |   | 890 | 26.5 | 400 | −20 |
| 8* | 47 | 53 | 12.5 | — | 1 | 1 | 850 | Unmeasurable*1 | | |
|    |    |    |      |    |   |   | 890 | Unmeasurable*1 | | |
| 9* | 47 | 53 | — | 0.5 | 1 | 1 | 850 | 23.5 | 460 | 30 |
|    |    |    |   |     |   |   | 890 | 29.5 | 450 | −35 |
| 10 | 47 | 53 | — | 1.0 | 1 | 1 | 850 | 26.0 | 465 | −10 |
|    |    |    |   |     |   |   | 890 | 27.5 | 450 | −35 |
| 11 | 47 | 53 | — | 10.0 | 1 | 1 | 850 | 25.5 | 410 | −30 |
|    |    |    |   |      |   |   | 890 | 26.0 | 400 | −25 |
| 12* | 47 | 53 | — | 12.5 | 1 | 1 | 850 | Unmeasurable*2 | | |
|     |    |    |   |      |   |   | 890 | 20.0 | 100 | −55 |
| 13 | 47 | 53 | 3 | — | — | 1 | 850 | 27.0 | 500 | 5 |
|    |    |    |   |   |   |   | 890 | 27.0 | 500 | 5 |
| 14 | 47 | 53 | — | 3 | — | 1 | 850 | 26.0 | 520 | 10 |
|    |    |    |   |   |   |   | 890 | 26.0 | 520 | 10 |

*comparative examples
Test configuration: 4532C chip (three layer product)
Measurement frequency: 4 MHz
*1 disconnection by CuO diffusion
*2 not consolidated

TABLE 4

MnO content vs. dielectric characteristics

| Sample No. | TiO$_2$ (mol %) | ZnO (mol %) | MnO | B$_2$O$_3$-glass (calcd. as B$_2$O$_3$) (wt %) | Insulation resistance (Ω) | Dielectric constant | Q | Temperature coefficient (ppm/°C.) |
|---|---|---|---|---|---|---|---|---|
| 1 | 56 | 44 | — | 1 | 2 × 10$^{10}$ | 29.0 | 4000 | 10 |
| 2 | 56 | 44 | 0.5 | 1 | 1 × 10$^{11}$ | 29.2 | 4500 | 15 |
| 3 | 56 | 44 | 1.0 | 1 | 5 × 10$^{11}$ | 29.3 | 5000 | 5 |
| 4 | 56 | 44 | 5.0 | 1 | 4 × 10$^{11}$ | 28.0 | 4000 | 25 |
| 5 | 56 | 44 | 10.0 | 1 | 1 × 10$^{11}$ | 26.0 | 3500 | 35 |
| 6* | 56 | 44 | 15.0 | 1 | Unmeasurable*1 | | | |

*comparative examples
Firing temperature: 870° C. in air
Test configuration: 4532C chip (three layer product)
Measurement frequency: 4 MHz
*1 not consolidated From the dielectric characteristics of the respective samples shown in Table 3, it is presumed that the phase formed upon firing of sample No. 1 at 850° C. is a ZnTiO$_3$+ rutile phase while the phase formed upon firing of sample No. 1 at 890° C. and the phase formed from the other samples are a Zn$_2$TiO$_4$+rutile phase.

It is seen from Table 3 that in the case of a Zn$_2$TiO$_4$+rutile phase, a change of temperature coefficient with the firing temperature is suppressed and the phase of formation is stable owing to the containment of CuO or NiO in the claimed content. The stable phase of formation indicates stabilization of various characteristics of products. CuO contents beyond the claimed range are undesirable because diffusion of the internal conductor can cause disconnection. With NiO contents beyond the claimed range, the sintering temperature becomes high enough to obstruct the use of Ag, Cu, Ag base alloy or Cu base alloy as the internal conductor. Especially CuO and NiO contents of 1 to 10% by weight are preferred because changes of the temperature coefficient and Q value with the firing temperature are minimized, that is, a $Zn_2TiO_4$+rutile phase is formed in a more stable manner.

It is also seen from Table 4 that insulation resistance characteristics are improved by the containment of manganese oxide in the claimed content. Beyond the claimed range, the sintering temperature becomes high enough to obstruct the use of Ag, Cu, Ag base alloy or Cu base alloy as the internal conductor. Particularly a MnO content of 1% by weight is effective for improving not only insulating resistance, but also dielectric characteristics such as dielectric constant, Q value and temperature coefficient.

Example 4

There were furnished main component raw materials ($TiO_2$ and ZnO) and $SiO_2$, which were weighed to provide a composition as shown in Table 5, wet milled for 16 hours in a ball mill, and then dried. The dried powder was then calcined in air at 950° C. for 2 hours. This was used as a base material. The base material, CuO, and an auxiliary component raw material ($B_2O_3$-containing glass) were weighed to provide a composition as shown in Table 5, wet milled for 16 hours in a ball mill, and then dried. The $B_2O_3$-containing glass used herein was the same as used in Example 1. The dried powder was then calcined in air at 800° C. for 2 hours. The calcined powder was wet milled in a ball mill until a mean particle size of about 0.1 to 0.3 μm was finally reached and then dried, obtaining a dielectric material powder. To 100 parts by weight of the dielectric material powder were added 3.2 parts by weight of ethyl cellulose and 2.8 parts by weight of poll;vinyl butyral as a binder and 87 parts by weight of terpineol and 5 parts by weight of butyl carbitol as a solvent. The mixture was mixed in an automated mortar and dispersed in a three-roll mill, obtaining a dielectric material paste. The dielectric material paste and a silver paste were alternately applied by a screen printing technique to form a layered structure which was cut into a chip of 4.5 mm×3.2 mm. The resulting green chip was fired in air at 870° C. for 2 hours. Silver was baked to the chip as the external conductor, obtaining a chip capacitor sample.

The thus prepared samples had dielectric characteristics as shown in Table 5. For comparison purposes, Table 5 also shows the characteristics of a sample which was prepared by adding the auxiliary component and CuO without calcining the base material.

Dielectric characteristics remain unchanged regardless of whether or not the base material is calcined and whether or not $SiO_2$ is added. However, the size of crystal grains after firing can be controlled by whether or not calcination is carried out and in accordance with the amount of $SiO_2$ added in the claimed range, which is advantageous for forming thin layers for chip capacitors. If $SiO_2$ is added beyond the claimed range, however, the sintering temperature becomes high enough to obstruct the use of Ag, Cu, Ag base alloy or Cu base alloy as the internal conductor.

We claim:

1. A dielectric ceramic composition comprising 40 to 90 mol % of $TiO_2$ and 60 to 10 mol % of ZnO as a main component and $B_2O_3$ and/or a $B_2O_3$-containing vitreous component as an auxiliary component in an amount of 0.1 to 6% by weight calculated as $B_2O_3$ and based on the weight of said main component.

2. The dielectric ceramic composition of claim 1 further comprising at least one of a Cu oxide, a Ni oxide, and a Mn oxide, whose contents are up to 10% by weight calculated as CuO, NiO and MnO, respectively, and based on the weight of said main component.

3. The dielectric ceramic composition of claim 1 which is prepared by mixing $TiO_2$ and ZnO as raw materials for said main component, calcining the mixture, mixing the mixture with $B_2O_3$ and/or a $B_2O_3$-containing vitreous component as a raw material for said auxiliary component, and firing the resulting mixture.

4. The dielectric ceramic composition of claim 1 which is prepared by mixing $TiO_2$ and ZnO as raw materials for said main component with up to 6% by weight based on the weight of the main component raw materials of $SiO_2$, calcining the mixture, mixing the mixture with $B_2O_3$ and/or a $B_2O_3$-containing vitreous component as a raw material for said auxiliary component, and firing the resulting mixture.

5. A multilayer chip capacitor comprising the dielectric ceramic composition of claim 1.

TABLE 5

Base material calcination and $SiO_2$ content vs. dielectric characteristics

| Sample No. | $TiO_2$ (mol %) | ZnO (mol %) | $SiO_2$ (wt %) | Base calcining temp. (°C.) | CuO | $B_2O_3$-glass (calcd. as $B_2O_3$) (wt %) | Maximum grain size (μm) | Dielectric constant | Q | Temperature coefficient (ppm/°C.) |
|---|---|---|---|---|---|---|---|---|---|---|
| 1 | 56 | 44 | — | none | 3 | 1 | 12 | 27 | 500 | 5 |
| 2 | 56 | 44 | — | 950 | 3 | 1 | 5 | 27 | 500 | 5 |
| 3 | 56 | 44 | 0.5 | 950 | 3 | 1 | 4 | 27 | 500 | 10 |
| 4 | 56 | 44 | 2.5 | 950 | 3 | 1 | 3 | 26 | 510 | 20 |
| 5 | 56 | 44 | 5.0 | 950 | 3 | 1 | 2 | 25 | 450 | 30 |
| 6* | 56 | 44 | 7.5 | 950 | 3 | 1 | Unmeasurable*1 | | | |

*comparative examples
Firing temperature: 870° C. in air
Test configuration: 4532C chip (three layer product)
Measurement frequency: 4 MHz
*1 not consolidated 6. The multilayer chip capacitor of claim 5 additionally comprising Ag, Cu, Ag base alloy or Cu base alloy as an internal conductor.

7. A dielectric filter comprising the dielectric ceramic composition of claim 1.

8. The dielectric filter of claim 7 additionally comprising Ag, Cu, Ag base alloy or Cu base alloy as an internal conductor.

9. An electronic part comprising an inductor section and a capacitor section comprising the dielectric ceramic composition of claim 1.

10. The electronic part of claim 9 additionally comprising Ag, Cu, Ag base alloy or Cu base alloy as an internal conductor.

* * * * *